United States Patent
McCormack (10) Patent No.: US 8,279,283 B2
(45) Date of Patent: Oct. 2, 2012

(54) METHODS AND SYSTEMS FOR OPERATING A VIDEO SURVEILLANCE SYSTEM

(75) Inventor: Kenneth McCormack, Albany, OR (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 1501 days.

(21) Appl. No.: 11/283,161

(22) Filed: Nov. 18, 2005

(65) Prior Publication Data

US 2007/0115358 A1    May 24, 2007

(51) Int. Cl.
    *H04N 5/247*    (2006.01)
(52) U.S. Cl. ........ 348/159; 348/153; 348/143; 348/135; 348/140; 348/141
(58) Field of Classification Search .................. 348/153, 348/159, 143, 135, 136, 137, 140, 141
    See application file for complete search history.

(56) References Cited

U.S. PATENT DOCUMENTS

| | | | |
|---|---|---|---|
| 4,825,394 A * | 4/1989 | Beamish et al. | ............... 356/147 |
| 5,243,418 A | 9/1993 | Kuno et al. | |
| 5,867,584 A | 2/1999 | Hu et al. | |
| 6,437,819 B1 * | 8/2002 | Loveland | ...................... 348/143 |
| 6,789,039 B1 | 9/2004 | Krumm | |
| 2002/0064382 A1 * | 5/2002 | Hildreth et al. | ............... 396/100 |
| 2005/0104958 A1 | 5/2005 | Egnal et al. | |
| 2005/0206726 A1 * | 9/2005 | Yoshida et al. | ............... 348/143 |

FOREIGN PATENT DOCUMENTS

WO    WO03044458 A1    5/2003

OTHER PUBLICATIONS

PCT International Search Report (6 pgs.); of Applicant: General Electric Company; International Application No. PCT/US2006/044372; International Filing Date: Nov. 15, 2006.

* cited by examiner

*Primary Examiner* — King Poon
*Assistant Examiner* — Jamares Q Washington
(74) *Attorney, Agent, or Firm* — MH2 Technology Law Group, LLP (57) ABSTRACT

Methods and systems for a video surveillance system include a plurality of video cameras, each including a field of view, the cameras are configured to at least one of zoom for changing the camera field of view, tilt for rotating the camera about a horizontal tilt axis, and pan for rotating the camera about a vertical pan axis. The system also includes a processor configured to receive a signal indicative of an image in the field of view of at least one video camera, recognize a target using the received signal, determine a direction to the target from the cameras that recognize the target, and transmit the determined direction to other ones of the plurality of video cameras.

19 Claims, 5 Drawing Sheets

METHODS AND SYSTEMS FOR OPERATING A VIDEO SURVEILLANCE SYSTEM

BACKGROUND OF THE INVENTION

This invention relates generally to video surveillance systems and, more particularly, to determining a position of multiple pan, tilt, and zoom camera assemblies in a spatial grid.

At least some known video surveillance systems include a plurality of video cameras mounted in a housing along with a respective pan, tilt, and zoom (PTZ) assembly. The PTZ permits controlling a movement of the camera to align a viewing area of the camera with an object of interest or location of interest. The zoom portion of the mechanism may be used to adjust a field of view of the camera. The housing typically includes an enclosure and a transparent or semi transparent hemispheric dome. The housing protects the camera from the environment in the location where the camera and PTZ assembly are mounted.

In some applications, the plurality of cameras are coordinated to provide video coverage to a large area with many line-of-sight obstacles. The large area may be, for example, a retail store interior, a warehouse interior, a commercial campus with cameras located internal and external to the buildings of the campus. The obstacles may make following a target of interest traveling through the area difficult. Additionally, manually transferring tracking of the target from one camera to another camera requires determining which camera's field of view the target is moving into at each point of travel through the area. In large systems such determination is cumbersome and may lead to instances wherein the target is lost from view in any camera and is required to be reacquired by at least one of the cameras before tracking the target can continue. Further, obstacles, such as pillars, columns, stacked boxes, racks of clothing, or other retail items, may also make tracking the target difficult.

BRIEF DESCRIPTION OF THE INVENTION

In one embodiment, a video surveillance system includes a plurality of video cameras, each including a field of view, the cameras are configured to at least one of zoom for changing the camera field of view, tilt for rotating the camera about a horizontal tilt axis, and pan for rotating the camera about a vertical pan axis. The system also includes a processor configured to receive a signal indicative of an image in the field of view of at least one video camera, recognize a target using the received signal, determine a direction to the target from the cameras that recognize the target, and transmit the determined direction to other ones of the plurality of video cameras.

In another embodiment, a method of operating a video surveillance system including a plurality of video cameras includes providing a first video camera communicatively coupled to a second video camera, recognizing a target with the first video camera, transmitting at least one characteristic of the target from the first video camera to the second video camera, and recognizing the target with the second video camera using the transmitted characteristics.

In yet another embodiment, a computer program embodied on a computer readable medium for operating a video surveillance system is provided. The system includes a first video camera communicatively coupled to a second video camera wherein the program includes at least one code segment that recognizes a target from signals received from the first video camera and then transmits at least one characteristic of the target from the first video camera to the second video camera, and recognizes the target from signals received from the second video camera using the transmitted characteristics.

DETAILED DESCRIPTION OF THE INVENTION

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
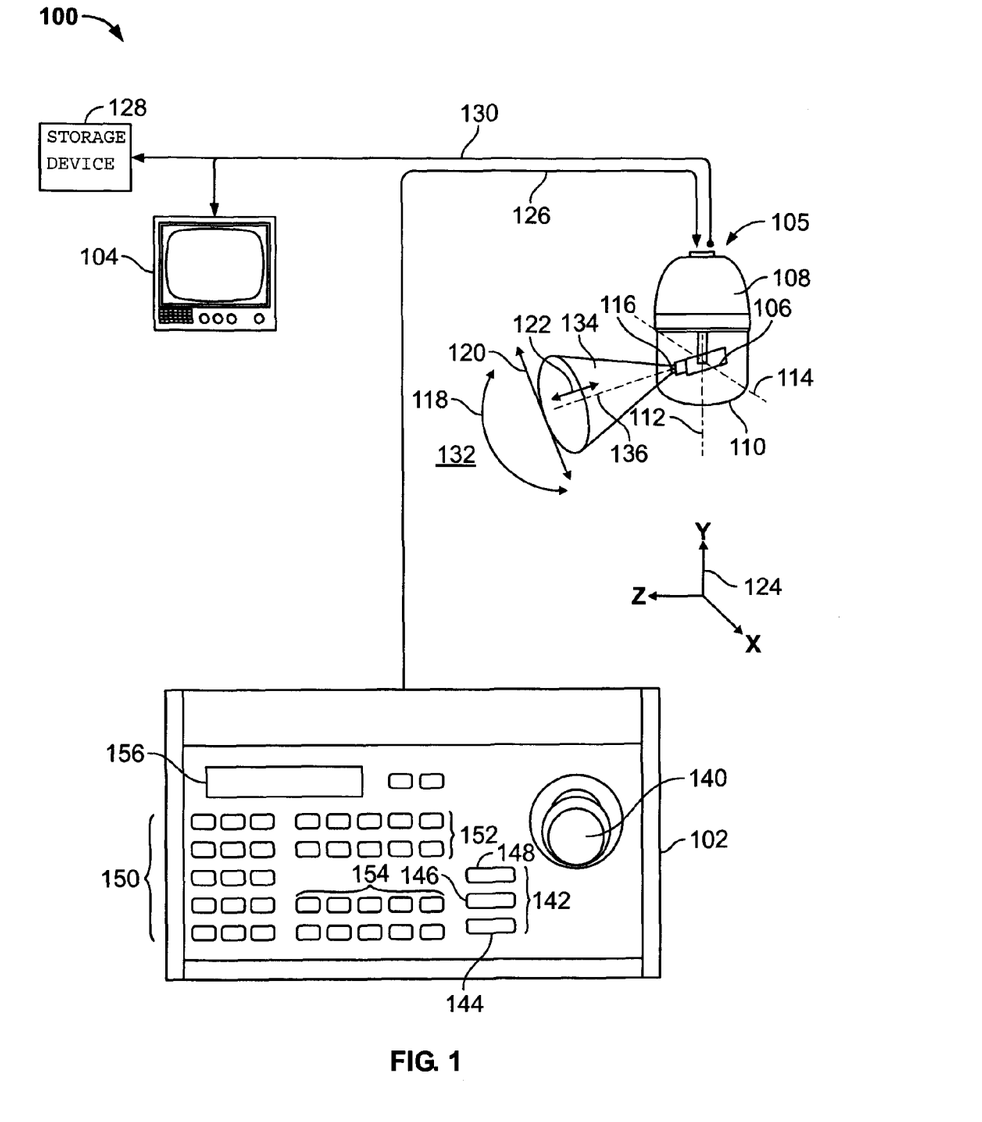
FIG. 1 is a schematic view of an exemplary video surveillance system in accordance with an embodiment of the present invention.

FIG. 1 is a schematic view of an exemplary video surveillance system 100 in accordance with an embodiment of the present invention. Video surveillance system 100 includes a control panel 102, a display monitor 104, and a pan, tilt, and zoom (PTZ) assembly 105. Typically, a camera 106 is housed in an enclosure 108 having a dome 110 for protecting camera 106 from the environment where camera 106 is located. In one embodiment, dome 110 is tinted to allow camera 106 to acquire images of the environment outside of enclosure 108 and simultaneously prevent individuals in the environment being observed by camera 106 from determining the orientation of camera 106. In various alternative embodiments, dome 110 is not tinted. In the exemplary embodiment, camera 106 includes capabilities to pan about a vertical axis 112, tilt about a horizontal axis 114, and control a lens assembly 116 to cause camera 106 to zoom. For example, PTZ assembly 105 includes a pan motor and encoder and tilt motor and encoder. The encoders determine an angular position of the pan and tilt motor and generate position signals that are used with a zoom setting to determine an area in the field of view. Panning movement of camera 106 is represented by an arrow 118, tilting movement of camera 106 is represented by arrow 120 and the changing of the focal length of lens assembly 116 of camera 106, i.e., zooming, is represented by arrow 122. As shown with reference to a coordinate system 124, panning motion may track movement along the x-axis, titling motion may track movement along the y-axis and focal length adjustment may be used to track movement along the z-axis. Signals representing commands to control such capabilities are transmitted from control panel 102 through a control data line 126. Image data signals are transmitted from camera 106 to display monitor 104 and a storage device 128 through a video data line 130.

Lens assembly 116 views an area of a location 132, which may be remote from control panel 102 and is in a field of view 134 and along a viewing axis 136 of lens assembly 116. Images of location 132 are converted by camera 106 into an electrical video signal, which is transmitted to display monitor 104.

In the exemplary embodiment, control panel 102 includes an X-Y control joystick 140 that is used to generate pan and tilt commands. A plurality of rocker-type switches 142 are used to control a zoom 144, a focus 146, and an iris 148 of lens assembly 116. In an alternative embodiment, joystick 140 includes a twist actuation that is used to control the zoom of camera 106. Joystick 140 may also incorporate triggers and/or buttons to facilitate operating various controls associated with system 100. Control panel 102 also includes a numeric keypad 150 for entering numbers and values. In an alternative embodiment, control panel 102 may include an alpha or alphanumeric keypad (not shown) for entering text as well as numbers. Control panel 102 further includes a plurality of preset switches 152 that may be programmed to execute macros that automatically control the actions of camera 106 and/or lens assembly 116. A plurality of buttons 154 may be used, for example, for predetermined control functions and/or user-defined functions, for example, a camera selection in a multi-camera video surveillance system. A display 156 may be used to display a status of video surveillance system 100 or may be used to display parameters associated with a selected camera.

In the exemplary embodiment, video surveillance system 100 is a single camera application, however, various embodiments of the present invention may be used within a larger surveillance system having additional cameras which may be either stationary or moveable cameras or some combination thereof to provide coverage of a larger or more complex surveillance area. In an alternative embodiment, one or more video recorders (not shown) are connected to control panel 32 to provide for recording of video images captured by camera 13 and other cameras in system 100.

Figure 2:
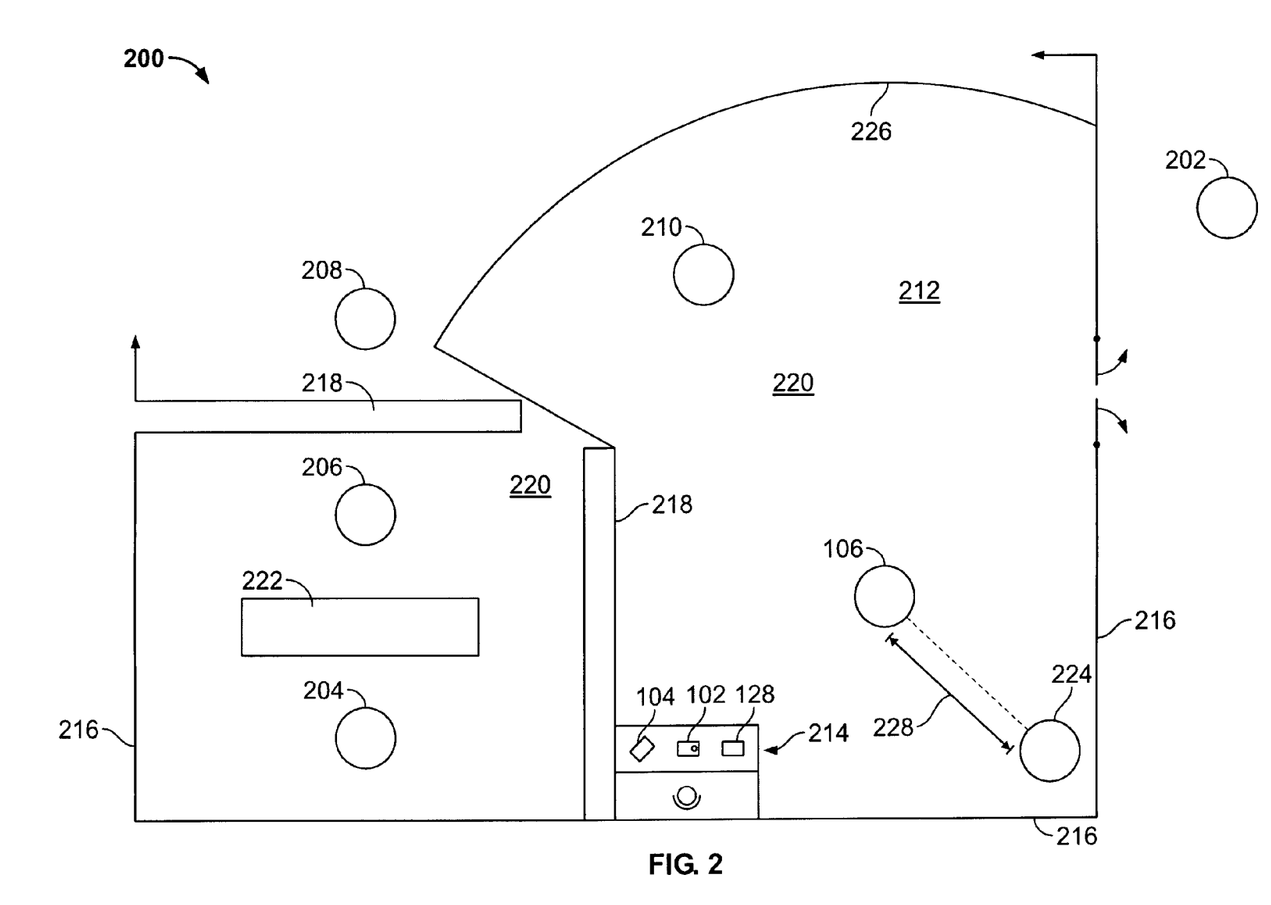
FIG. 2 is a schematic plan view of an alternate embodiment of the video surveillance system shown in FIG. 1.

FIG. 2 is a schematic plan view of an alternate embodiment of video surveillance system 100 (shown in FIG. 1). A video surveillance system 200 is an expanded version of system 100 that includes a plurality of video cameras 202, 204, 206, 208, and 210 spaced about an area under surveillance 212. Components in system 200, identical to components of system 100 (shown in FIG. 1), are identified in FIG. 2 using the same reference numerals as used in FIG. 1. More or less cameras may be included in system 200.

System 200 includes a control room 214 where components for controlling system 200 and a user are located. Each camera is communicatively coupled to control panel 102 and display monitor 104. In the exemplary embodiment, area under surveillance 212 is represented by a warehouse, although any commercial, residential, or industrial facility may be monitored by system 200. In the exemplary embodiment, area under surveillance 212 includes walls 216 defining a perimeter of an interior of area under surveillance 212 and walls 218 that divide the interior into rooms 220. Other obstructions, such as shelving units 222 are typically present to obstruct at least a portion of a field of view of cameras 106, 202, 204, 206, 208, and 210.

During operation, the performance of multiple video cameras in a network is improved when the spatial coordinates (X, Y, Z) of each camera is known and the coverage of each camera is calibrated. Such information is used for multiple cameras to independently locate the same target from different angles. In the exemplary embodiment, calibration of multiple cameras is performed in two stages, a rough training stage and a refinement stage.

Rough training of a network of cameras is performed with a simulated target 224. In the exemplary embodiment, target 224 includes a cluster of spheres that possess characteristics unique to the environment, such as a shape, a size, a color, pattern of target 224. The size of each sphere is approximately two feet in diameter. The exemplary embodiment of target 224 has the property that the angle of the camera from the target's point of view can be derived from images from the camera while the camera is pointing at the target. This angle is the called the target to camera angle and includes a vertical and horizontal component more commonly known as azimuth and elevation.

Target 224 is positioned in an area of view 226 of any one of the cameras in the network, in this example, camera 106 at a predetermined normal target distance 228. A command to locate target 224 is transmitted to camera 106 and camera 106 executes a search of area of view 226 until it finds a candidate target. The search is a preprogrammed or dynamic set of pan, tilt, and/or zoom commands that are executed while receiving video signals from camera 106. The video signals are compared to target characteristics stored in a memory, when a comparison meets predetermined threshold criteria the identified object is tagged as a target candidate and searching continues until completed. Each camera may have a predetermined set of stored search commands that are selectable by a user or by a learning algorithm used to facilitate search optimization or by assistance from a human operator. The search may be completed by executing the last of the programmed set of pan, tilt, and/or zoom commands or may be completed at any time such as when one or more target candidates have been identified. The acquisition of target 224 is confirmed by moving target 224 about area of view 226. Camera 106 remains pointed at target 224 while target 224 is moved about area of view 226 if camera 106 has acquired target 224. When the acquisition of the reference target is confirmed, camera 106 transmits characteristics of target 224, such as a shape, a size, a color, and a pattern of target 224 to at least one other camera in the network.

After rough training is completed on camera 106 a command to calibrate the network is sent to all cameras in system 100. Each video camera 202, 204, 206, 208, and 210 execute commands to search for target 224 within a respective area of view. Target 224 is repositioned about area under surveillance 212 such that each camera detects and recognizes target 224 as it passes through the area of view of each video camera 202, 204, 206, 208, and 210. The target to camera angle, pan, tilt, and zoom parameters of each video camera 202, 204, 206, 208, and 210 are transmitted to each other video cameras in the network. In various embodiments, target to camera angle, pan, tilt and zoom parameters are transmitted continuously in real-time to each other video camera. As used herein, real-time refers to outcomes occurring at a substantially short period after a change in the inputs affecting the outcome. The period may be the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome or may be a delay inherent in the components that comprise the system. In other embodiments the target to camera angle, pan, tilt, and zoom parameters are transmitted periodically to each other video camera. Transmitting the pan, tilt and zoom parameters of each camera to each other camera enables each video camera to determine a direction to point to locate target 224.

The refinement stage of the spatial grid locating procedure does not require target 224 and is performed automatically by system 100 using the camera network. From the rough training stage, each camera approximately determines its location in the spatial grid with respect to each other camera in the network. Two or more cameras that were able to acquire target 224 simultaneously register images from different angles to further refine the position data. The zoom factor is iteratively increased and the images are further correlated to refine the relative position data. After a pair of cameras has located two objects in their field of view the distance and the relative angle between the cameras can be determined. The calibration of pairs of cameras continues for all combinations of cameras that were able to locate target 224 simultaneously. The values for the distances between cameras are then synthesized into a grid using constraint mapping. The grid shows where the cameras are placed and roughly the coverage area of each camera. A database created by the spatial grid locating procedure is referenced to allow multiple cameras to automatically locate and view a target within the covered area.

Figure 3:
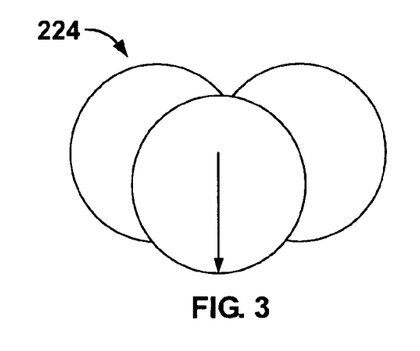
FIG. 3 is a perspective view of an exemplary embodiment of target 224 (shown in FIG. 2) from a 0° azimuth, 5° elevation orientation.
Figure 4:
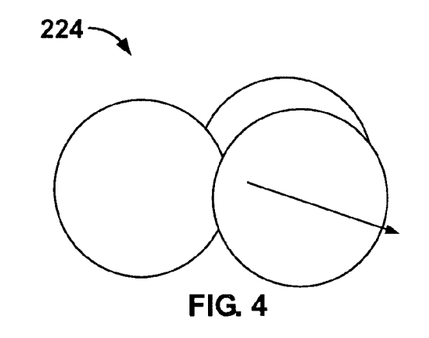
FIG. 4 is another perspective view of the exemplary embodiment of target 224 (shown in FIG. 3) from a 45° azimuth, 5° elevation orientation.
Figure 5:
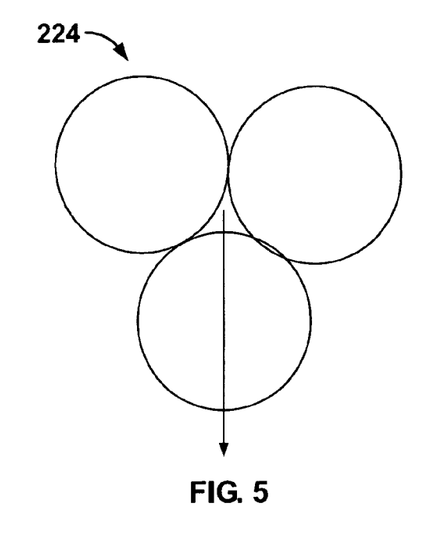
FIG. 5 is yet another perspective view of the exemplary embodiment of target 224 (shown in FIG. 3) from a 0° azimuth, 90° elevation orientation.
Figure 6:
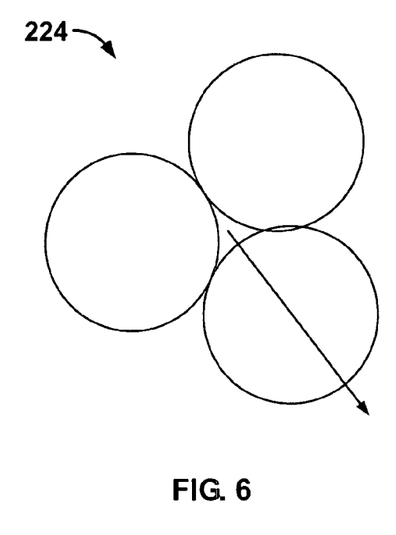
FIG. 6 is yet another perspective view of the exemplary embodiment of target 224 (shown in FIG. 3) from a 45° azimuth, 90° elevation orientation.

FIG. 3 is a perspective view of an exemplary embodiment of target 224 (shown in FIG. 2) from a 0° azimuth, 5° elevation orientation. FIG. 4 is another perspective view of the exemplary embodiment of target 224 (shown in FIG. 3) from a 45° azimuth, 5° elevation orientation. FIG. 5 is yet another perspective view of the exemplary embodiment of target 224 (shown in FIG. 3) from a 0° azimuth, 90° elevation orientation. FIG. 6 is yet another perspective view of the exemplary embodiment of target 224 (shown in FIG. 3) from a 45° azimuth, 90° elevation orientation.

Figure 7:
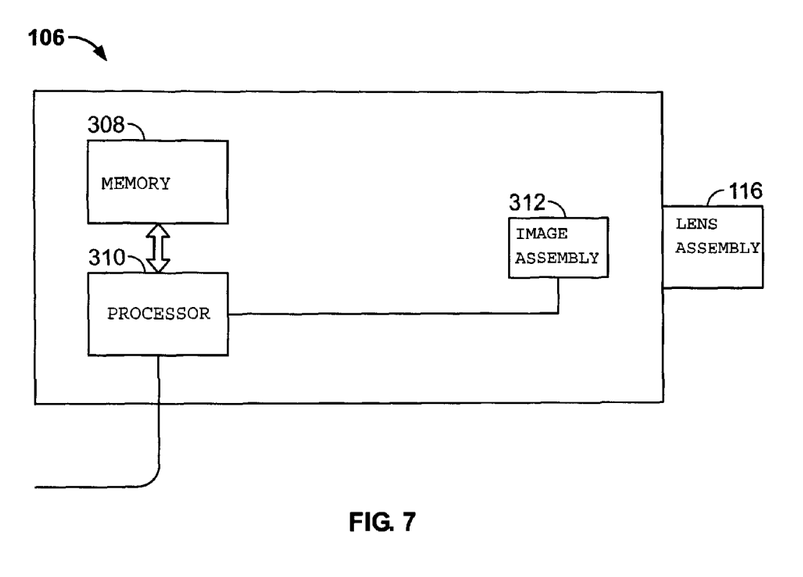
FIG. 7 is a schematic block diagram of an exemplary embodiment of the camera shown in FIG. 1.

FIG. 7 is a schematic block diagram of an exemplary embodiment of camera 106 (shown in FIG. 1). A processor 310 receives programmed instructions, from software or firmware, and data from memory 308 and performs various operations using the data and instructions. Processor 310 may include an arithmetic logic unit (ALU) that performs arithmetic and logical operations and a control unit that extracts instructions from memory 308 and decodes and executes them, calling on the ALU when necessary. Memory 308 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). In addition, memory 308 may include an operating system, which executes on processor 310. The operating system performs basic tasks that include recognizing input, sending output to output devices, keeping track of files and directories and controlling various peripheral devices.

An image assembly 312 converts light received through lens assembly 116 into electrical signals representative of an image of field of view 134. The electrical signals are transmitted to monitor 104 or storage device 128 through processor 310. The term processor, as used herein, refers to central processing units, microprocessors, microcontrollers, reduced instruction set circuits (RISC), application specific integrated circuits (ASIC), logic circuits, and any other circuit or processor capable of executing the functions described herein. Memory 308 may include storage locations for the preset macro instructions that may be accessible using one of the plurality of preset switches 142.

As used herein, the terms "software" and "firmware" are interchangeable, and include any computer program stored in memory for execution by processor 310, including RAM memory, ROM memory, EPROM memory, EEPROM memory, and non-volatile RAM (NVRAM) memory. The above memory types are exemplary only, and are thus not limiting as to the types of memory usable for storage of a computer program.

In various embodiments, processor 310 and memory 308 are located external to camera 106 such as in control panel 102 or in a PC or other standalone or mainframe computer system capable of performing the functions described herein.

Figure 8:
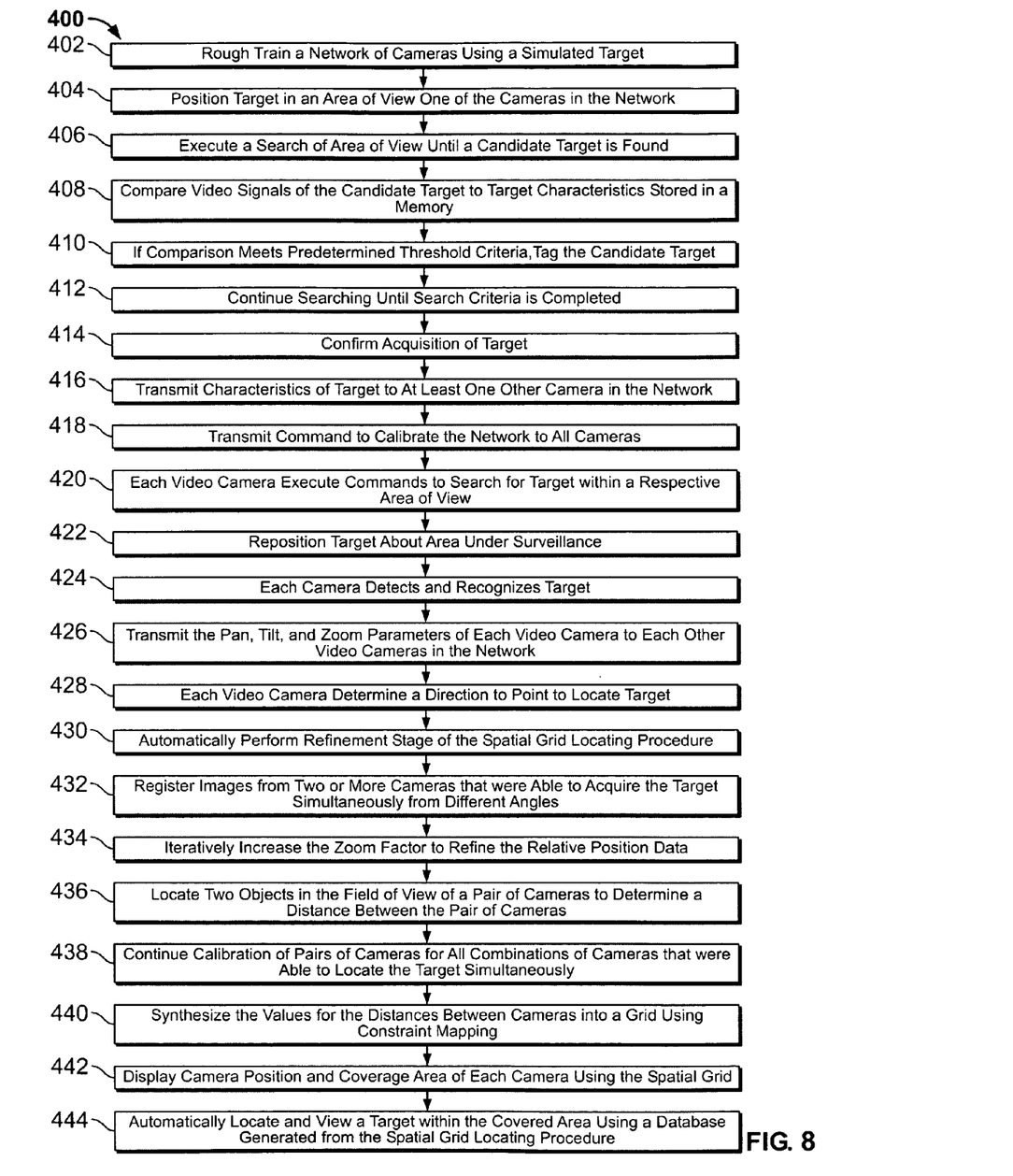
FIG. 8 is a flowchart of an exemplary method 400 of determining the spatial coordinates of each camera and calibrating the coverage of each camera in a network of cameras.

FIG. 8 is a flowchart of an exemplary method 400 of determining the spatial coordinates (X, Y, and Z) of each camera and calibrating the coverage of each camera in a network of cameras. Such information is used for multiple cameras to independently locate the same target from different angles. In the exemplary embodiment, calibration of multiple cameras is performed in two stages, a rough training stage and a refinement stage.

Rough training 402 of a network of cameras is performed with a simulated target 224. In the exemplary embodiment, target 224 is a cluster of round objects and possesses characteristics that are unique to the environment, such as a shape, a size, a color, and a pattern. The simulated target has the property that the angle from the camera to the target can be estimated. This angle has vertical and horizontal components more commonly known as azimuth and elevation.

Target 224 is positioned 404 in an area of view 226 of any one of the cameras in the network, in this example, camera 106 at a predetermined normal target distance 228. A command to locate target 224 is transmitted to camera 106 and camera 106 executes 406 a search of area of view 226 until it finds a candidate target. The search is a programmed set of pan, tilt, and/or zoom commands that are executed while receiving video signals from camera 106. The video signals are compared 408 to target characteristics stored in a memory, when a comparison meets 410 predetermined threshold criteria the identified object is tagged as a target candidate and searching continues 412 until completed. Each camera may have a predetermined set of stored search commands that are selectable by a user or by a learning algorithm used to facilitate search optimization. The search may be completed by executing the last of the programmed set of pan, tilt, and/or zoom commands or may be completed at any time such as when one or more target candidates have been identified. The acquisition of target 224 is confirmed 414 by moving target 224 about area of view 226. Camera 106 remains pointed at target 224 while target 224 is moved about area of view 226 if camera 106 has acquired target 224. When the acquisition of the reference target is confirmed, camera 106 transmits 416 characteristics of target 224, such as a shape, a size, a color, pattern, and a speed of movement of target 224 to at least one other camera in the network.

After training is completed on camera 106 a command to calibrate the network is transmitted 418 to all cameras in system 100. Each video camera 202, 204, 206, 208, and 210 execute commands to search 420 for target 224 within a respective area of view. Target 224 is repositioned 422 about area under surveillance 212 such that each camera detects and recognizes 424 target 224 as it passes through the area of view of each video camera 202, 204, 206, 208, and 210. The pan, tilt, and zoom parameters of each video camera 202, 204, 206, 208, and 210 are transmitted 426 to each other video cameras in the network. In various embodiments, the pan, tilt and zoom parameters are transmitted continuously in real-time to each other video camera. As used herein, real-time refers to outcomes occurring at a substantially short period after a change in the inputs affecting the outcome. The period may be the amount of time between each iteration of a regularly repeated task. Such repeated tasks are called periodic tasks. The time period is a design parameter of the real-time system that may be selected based on the importance of the outcome and/or the capability of the system implementing processing of the inputs to generate the outcome or may be a delay inherent in the components that comprise the system. In other embodiments the pan, tilt, and zoom parameters are transmitted periodically to each other video camera. Transmitting the pan, tilt and zoom parameters of each camera to each other camera enables each video camera to determine 428 a direction to point to locate target 224. It also enables each video camera to transmit a speed of target 224, which facilitates acquisition of target 224.

The refinement stage of the spatial grid locating procedure does not require target 224 and is performed 430 automatically by system 100 using the camera network. From the rough training stage, each camera approximately determines its location in the spatial grid with respect to each other camera in the network. Two or more cameras that were able to acquire target 224 simultaneously register 432 images from different angles to further refine the position data. The zoom factor is iteratively increased 434 and the images are further correlated to refine the relative position data. After a pair of cameras has located 436 two objects in their field of view the distance between them is determined. The calibration of pairs of cameras continues 438 for all combinations of cameras that were able to locate target 224 simultaneously. The values for the distances and angles between cameras are then synthesized 440 into a grid using constraint mapping. The grid illustrates 442 a camera position and the approximate coverage area of each camera. A database created by the spatial grid locating procedure is referenced to allow multiple cameras to automatically locate 444 and view a target within the covered area.

Although the embodiments described herein are discussed with respect to a video surveillance system, it is understood that the method of locating the position of multiple assemblies in a spatial grid described herein may be used with other mechanical and electromechanical systems.

The above-described embodiments of a video surveillance system provide a cost-effective and reliable means for enabling an operator to locate a target with one camera and automatically locate the same target with all other available cameras.

Exemplary embodiments of video surveillance systems and apparatus are described above in detail. The video surveillance system components illustrated are not limited to the specific embodiments described herein, but rather, components of each system may be utilized independently and separately from other components described herein. For example, the video surveillance system components described above may also be used in combination with different video surveillance system components.

A technical effect of the various embodiments of the systems and methods described herein include facilitating operation of the video surveillance system by using target recognition to calibrate a plurality a cameras such that their relative positions in a system are known and each camera that recognizes a target transmits target characteristics, such as target position, to other cameras.

While the invention has been described in terms of various specific embodiments, those skilled in the art will recognize that the invention can be practiced with modification within the spirit and scope of the claims.

What is claimed is:

1. A video surveillance system comprising:
a plurality of video cameras, each comprising a field of view, said cameras configured to at least one of zoom for changing the camera field of view, and tilt for rotating the camera about a horizontal tilt axis, and pan for rotating the camera about a vertical pan axis; and
a processor configured to:
receive a signal indicative of an image of a calibration target in the field of view of a first video camera of said plurality of video cameras at a position defined by a pan parameter, a tilt parameter, and a zoom parameter;
recognize the calibration target within the image using the received signal, the calibration target having a property that a calibration target to camera angle can be derived from images of the calibration target;
derive a calibration target to first camera angle from the image using the property of the target;
transmit the pan, tilt, and zoom parameters and the calibration target to first camera angle to a second video camera of said plurality of video cameras;
receive a signal indicative of an image in the field of view of said second video camera at a position defined by said pan parameter, said tilt parameter and said zoom parameter transmitted from said first video camera to said second video camera;
recognize said calibration target within the image in the field of view of said second video camera using said received signal of said second video camera;
derive a calibration target to second camera angle from the image of said second video camera using the property of the calibration target;
determine the location of the first camera relative to the second camera based on the calibration target to first video camera angle and the calibration target to second video camera angle;
determine a spatial grid of a location of the first video camera and the second video camera relative to each other camera of the plurality of video cameras based on the calibration target to first video camera angle and the calibration target to second video camera angle; and
refining the spatial grid, wherein refining the spatial grid includes: registering a first image of the calibration target captured by the first video camera; registering a second image of the calibration target captured by the second video; and iteratively increasing a zoom factor of the first image and the second image to refine a relative position.

2. A system in accordance with claim 1 wherein said plurality of video cameras are spaced about an area under surveillance such that at least a portion of the field of view of at least some of said plurality of video cameras overlaps at least a portion of the field of view of at least some others of said plurality of video cameras.

3. A system in accordance with claim 1 wherein said processor is configured to recognize at least one characteristic of the calibration target.

4. A system in accordance with claim 3 wherein said processor is configured to recognize at least one of a shape, a size, a color, and a pattern of the calibration target.

5. A system in accordance with claim 1 wherein said processor is configured to automatically select the calibration target from a plurality of potential calibration targets using a predetermined characteristic of the calibration target.

6. A system in accordance with claim 1 wherein said processor is configured to generate camera movement commands that facilitate maintaining the calibration target in a field of view of said first video camera.

7. A system in accordance with claim 1 wherein said processor is configured to generate camera movement commands that define a search pattern for each of said plurality of video cameras.

8. A system in accordance with claim 1 wherein said processor is configured to generate a search pattern for predetermined ones of said plurality of video cameras, the search pattern based on the angle from the calibration target to said first video camera and the pan, tilt, and zoom parameters.

9. A system in accordance with claim 1 wherein said processor is configured to generate a database including a relative position of each video camera with respect to each other video camera in the video surveillance system.

10. A method of calibrating a video surveillance system including at least a first video camera and a second video camera, said method comprising:
recognizing a calibration target within an image captured by the first video camera at pan, tilt, and zoom described by first camera field-of-view parameters, the calibration target having a property that a calibration target to camera angle can be derived from images of the calibration target;
deriving a calibration target to first video camera angle from the image captured by the first video camera using the property of the calibration target;
transmitting at least one characteristic of the calibration target, the first camera field-of-view parameters, and the calibration target to first video camera angle from the first video camera to the second video camera;
recognizing the calibration target within an image captured by the second video camera at pan, tilt, and zoom described by second camera field-of-view parameters, based on the transmitted characteristics;
deriving a calibration target to a second video camera angle from the image captured by the second video camera using the property of the calibration target;
determining the location of the first camera relative to the second camera based on the calibration target to first video camera angle, the calibration target to second video camera angle, the first camera field-of-view parameters, and the second camera field-of-view parameters;
determining a spatial grid of a location of the first video camera and the second video camera relative to each other camera of the plurality of video cameras based on the calibration target to first video camera angle and the calibration target to second video camera angle; and
refining the spatial grid, wherein refining the spatial grid includes: registering a first image of the calibration target captured by the first video camera; registering a second image of the calibration target captured by the second video; and iteratively increasing a zoom factor of the first image and the second image to refine a relative position.

11. A method in accordance with claim 10 further comprising communicating between the first and second video cameras through a video surveillance system processor.

12. A method in accordance with claim 10 wherein recognizing the calibration target within the image captured by the first video camera comprises:
determining at least one of a shape, a size, a color, a pattern, and a speed of movement of the calibration target;
automatically selecting the calibration target from a plurality of potential calibration targets using a predetermined characteristic of the calibration target; and
generating camera movement commands that facilitate maintaining the calibration target in a field of view of the first video camera.

13. A method in accordance with claim 10 wherein recognizing the calibration target within the image captured by the second video camera based on the transmittal characteristics comprises at least one of:
generating camera movement commands that define a search pattern for the second video camera; and
executing a search of the area of view of the second video camera for the calibration target, wherein the area of view represents the camera field of view at all pan, tilt, and zoom positions.

14. A method in accordance with claim 10 wherein the calibration target has the property that each calibration target to camera angle can be determined from images from the corresponding camera.

15. A method in accordance with claim 10 wherein determining the location of the first camera relative to the second camera comprises:
determining a first vector of the field of view of the first video camera and a second vector of the second video camera; and
determining a relative position of the first video camera and the second video camera with respect to each other using the first and second vectors.

16. A computer program embodied on a non-transitory computer readable medium for operating a video surveillance system including a first video camera communicatively coupled to a second video camera, said program comprising at least one code segment that recognizes a calibration target video signals received from the first video camera, the calibration target having a property that a calibration target to camera angle can be derived from images of the calibration target, and then:
determines a calibration target to first video camera angle based on at least one image captured by the first video camera;
transmits at least one characteristic of the calibration target and the calibration target to first video camera angle from the first video camera to the second video camera;
determines a direction to orient the second video camera to locate the calibration target based on the calibration target to first video camera angle;
recognizes the calibration target by comparing video signals received from the second video camera to the transmitted characteristics;
determines a calibration target to second video camera angle based on at least one image captured by the second video camera, using the property of the calibration target;
determines the location of the first camera relative to the second camera based on the calibration target to first video camera angle and the calibration target to second video camera angle;
determines a spatial grid of a location of the first video camera and the second video camera relative to each other camera of the plurality of video cameras based on the calibration target to first video camera angle and the calibration target to second video camera angle; and
refining the spatial grid, wherein refining the spatial grid includes: registering a first image of the calibration target captured by the first video camera; registering a second image of the calibration target captured by the second video; and iteratively increasing a zoom factor of the first image and the second image to refine a relative position.

17. A computer program in accordance with claim 16 further comprising at least one code segment that recognizes the calibration target using at least one of a determined shape, size, color, pattern, and speed of movement of the calibration target.

18. A method in accordance with claim 10 wherein determining the calibration target to first video camera angle includes determining an azimuth angle and an elevation angle of the first video camera from a point of view of the calibration target.

19. A system in accordance with claim 5 wherein the predetermined characteristic of the calibration target facilitates deriving the angle from the calibration target to said first video camera from the image captured by said first video camera.

* * * * *